United States Patent [19]
Shiraishi

[11] Patent Number: 5,764,382
[45] Date of Patent: Jun. 9, 1998

[54] DATA READER

[75] Inventor: Yasuhiro Shiraishi, Hino, Japan

[73] Assignee: Kabushiki Kaisha Toshiba, Kawasaki, Japan

[21] Appl. No.: 797,243

[22] Filed: Feb. 7, 1997

Related U.S. Application Data

[63] Continuation of Ser. No. 326,746, Oct. 20, 1994, abandoned, which is a continuation of Ser. No. 882,125, May 13, 1992, abandoned.

[30] Foreign Application Priority Data

May 14, 1991 [JP] Japan ................................. 3-136980

[51] Int. Cl.$^6$ ............................. H04N 1/04; G03B 27/00
[52] U.S. Cl. ........................ 358/496; 358/474; 358/494; 358/498; 355/407
[58] Field of Search ........................ 358/496, 497, 358/498, 474, 471, 494, 475; 250/208.1; 355/81, 407, 84; 346/160, 160.1; H04N 1/04

[56] References Cited

U.S. PATENT DOCUMENTS

| | | | |
|---|---|---|---|
| 4,417,260 | 11/1983 | Kawai et al. | 358/494 |
| 4,588,280 | 5/1986 | Ogawa et al. | 355/3 R |
| 4,870,502 | 9/1989 | Dreinhoff et al. | 358/474 |
| 4,953,037 | 8/1990 | Ito et al. | 358/496 |
| 4,970,606 | 11/1990 | Shima | 358/474 |
| 5,267,058 | 11/1993 | Sata | 358/496 |
| 5,276,536 | 1/1994 | Hokamura | 358/496 |

FOREIGN PATENT DOCUMENTS

| | | | |
|---|---|---|---|
| 2-13354 | 1/1990 | Japan. | |
| 2-238765 | 9/1990 | Japan. | |
| 3098919 | 4/1991 | Japan | 358/468 |

*Primary Examiner*—Kim Yen Vu
*Assistant Examiner*—Madeleine AV Nguyen
*Attorney, Agent, or Firm*—Finnegan, Henderson, Farabow, Garrett & Dunner, L.L.P.

[57] ABSTRACT

A data reader in which a data reading unit reads character/picture images from an original document on a reading plane of the data reading unit as the original document is fed on the reading plane. The data reader comprises a restricting member disposed at a position facing at least a reading position of the data reading unit to be moved toward and away from the reading plane, the restricting member defining together with the reading plane a predetermined spacing therebetween into which the document is introduced, and also comprises an energization member for energizing the restricting member always toward the reading plane.

17 Claims, 9 Drawing Sheets

DATA READER

This application is a continuation of application Ser. No. 08/326,746, filed Oct. 20, 1994, now abandoned, which is a continuation of application Ser. No. 07/882,125, filed May 13, 1992, now abandoned.

BACKGROUND OF THE INVENTION

1. Field of the Invention

The present invention relates to improvements in a data reader in which an original document is moved on a reading plane of a data reading unit so that the reading unit reads out character/picture images from the document.

2. Description of the Related Art

A general data reader for reading character/picture images from an original document being moved along a data reading plane of a data reading unit is designed so that, when the original document is moved to a desired reading position of the data reading unit, that is, when the document is guided to be located within its predetermined distance, e.g., within a depth of field of the data reading unit, a resolution of the document by the data reading unit is set to be within a practical range.

FIG. 18 conceptionally shows a type of data reader, in which a guide roller 3 is provided at such a position that is opposed to a data reading unit 10 with respect to a carrier zone 2 of an original document 1 at a reading position α of the reading unit 10. In more detail, the guide roller 3 is disposed to be rotatable about its axis in such a manner that the guide roller 3 is press-contacted at its peripheral surface with an outer surface of a transparent plate 11, which forms the reading plane of the reading unit 10. The guide roller 3 is connected at its rotary shaft 3a to a drive source 4, such as an electric motor, through a gear train (not shown).

With such a data reader, since the document 1 fed by the periphery of the rotating guide roller 3 is guided onto the transparent plate 11, the character/picture images of the document 1 can be accurately read out.

With such a data reader, however, since the guide roller 3 is connected to the drive source 4 via the gear train (not shown) as mentioned above, it is difficult to move the position of the rotary shaft 3a of the roller 3.

Thus, in the case where the thickness of the document is larger than the spacing t preset between the outer surface of the transparent plate 11 and the peripheral surface of the guide roller 3, the aforementioned data reader cannot read out the character/picture images from the document. That is, as mentioned above, the spacing t is determined by the field depth of the data reading unit 10 and thus cannot take too large a value, which imposes remarkable restrictions on documents to be read.

In addition, the above data reader cannot achieve compactness because the gear train (not shown) and the drive source 4 for rotating the guide roller 3 must be provided within the interior of the reader.

SUMMARY OF THE INVENTION

In view of the above situations, it is therefore an object of the present invention to provide a data reader which can be made small in size and read even a thick document.

In order to attain the above object, the present invention comprises a restricting member disposed at a position facing at least a reading position of a data reading unit to be moved toward and away from a reading plane, the restricting member defining together with the reading plane a predetermined spacing therebetween into which an original document is introduced, and also comprises an energization member for energizing the restricting member always toward the reading plane.

In accordance with the present invention, since the restricting member is shifted to a suitable position according to the thickness of the original document to be fed and guides the document within the depth of field of the reading unit at the shifted position, the present invention can read even a thick document accurately.

In addition, because the present invention eliminates the need for the provision of such drive system parts as a gear train and a drive source, the invention can be easily made small in size .

DESCRIPTION OF THE PREFERRED EMBODIMENTS

Figure 1:
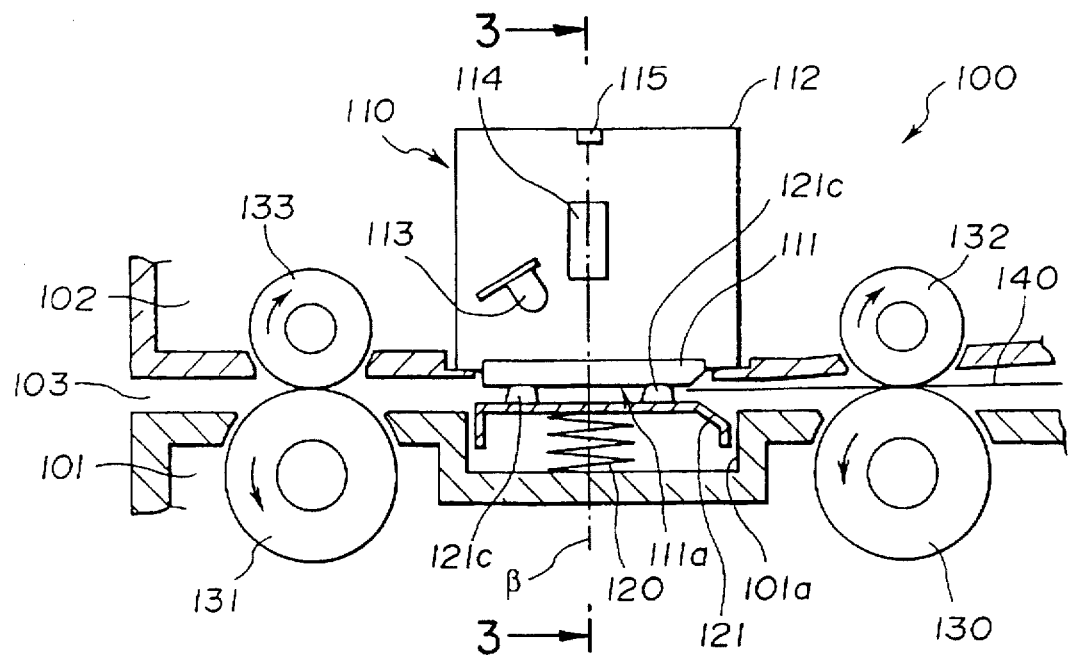
FIG. 1 is a cross-sectional view of a major part of a data reader in accordance with a first embodiment of the present invention.

Referring first to FIG. 1, there is shown a data reader in accordance with a first embodiment of the present invention.

Figure 2:
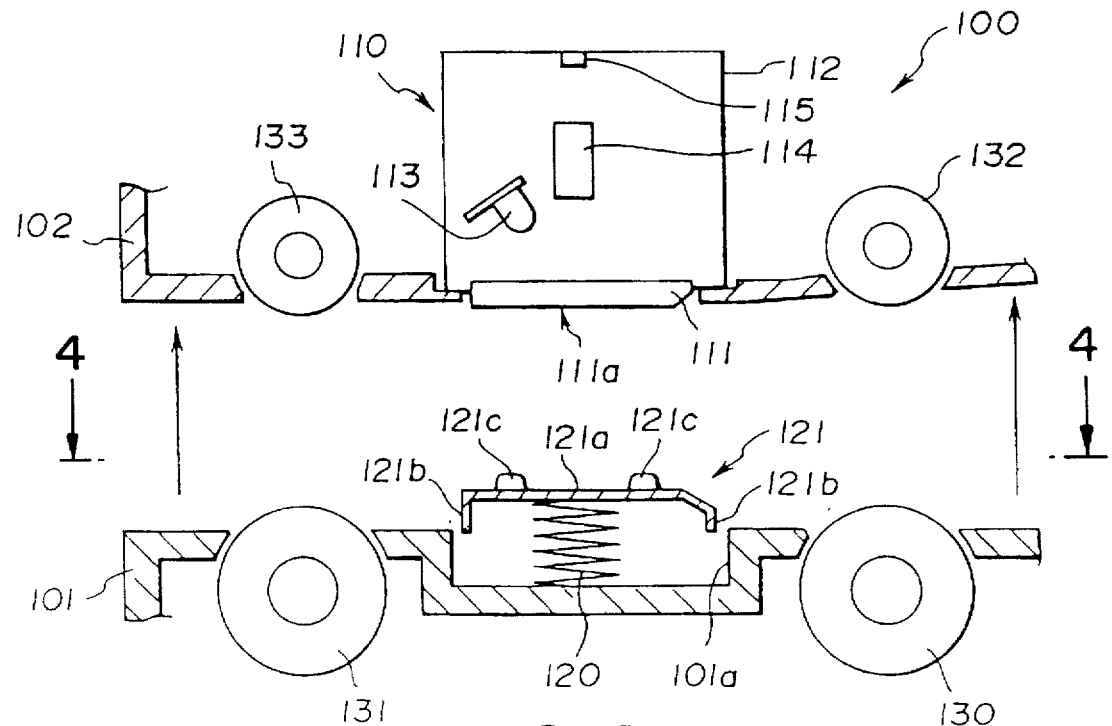
FIG. 2 is an exploded cross-sectional view of the major part of the first embodiment.

As shown more clearly in FIG. 2, the illustrated data reader is applied as an example to a facsimile machine 100. In this case, the facsimile machine 100 includes a main casing 101 and a sub casing 102 which can be opened or removed from the main casing 101. Defined between the main casing 101 and the sub casing 102 is an original document carrier zone 103. Mounted on the sub casing 102 is a data reading unit 110.

The data reading unit 110 used in the facsimile machine 100 is known as a so-called contact type image sensor in which a light source 113, a rod lens array 114 and a photoelectric conversion element array 115 are disposed within the interior of a frame 112 covered at its one side by a cover glass plate 111. The cover glass plate 111 is held to the sub casing 102 so as to face the aforementioned document carrier zone 103, with this image sensor 110, an outer surface 111a or the cover glass plate 111 is formed as a data reading plane and a reading position β is set in the center of the cover glass plate 111. Further, the image sensor 110 according to the first embodiment is designed to have a field depth of 0.6 mm spaced from the outer surface 111a of the cover glass plate The main casing 101 of the facsimile machine 100 is provided therein with a recess 101a which is opposed to the document carrier zone 103. The recess 101a, which has a rectangular opening substantially corresponding in size to one side of the frame 112 of the image sensor 110, is located at a position opposed to the image sensor 110.

Figure 3:
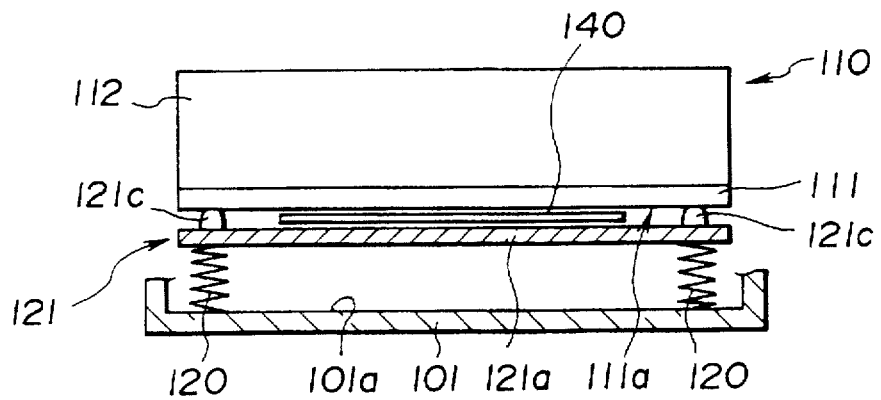
FIG. 3 is a cross-sectional view taken along line 3—3 in FIG. 1.
Figure 4:
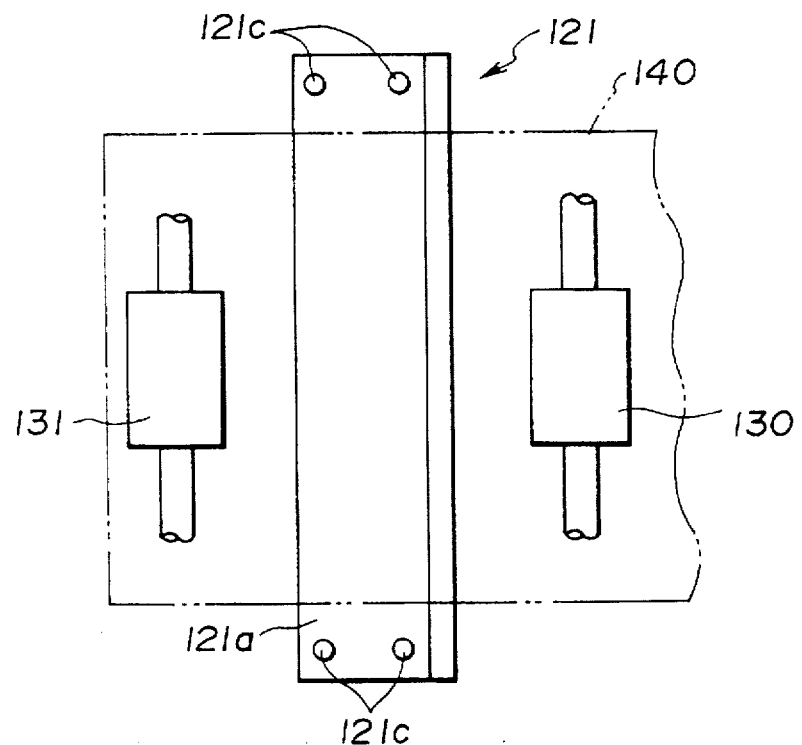
FIG. 4 is a cross-sectional view taken along line 4—4 in FIG. 2.
Figure 5:
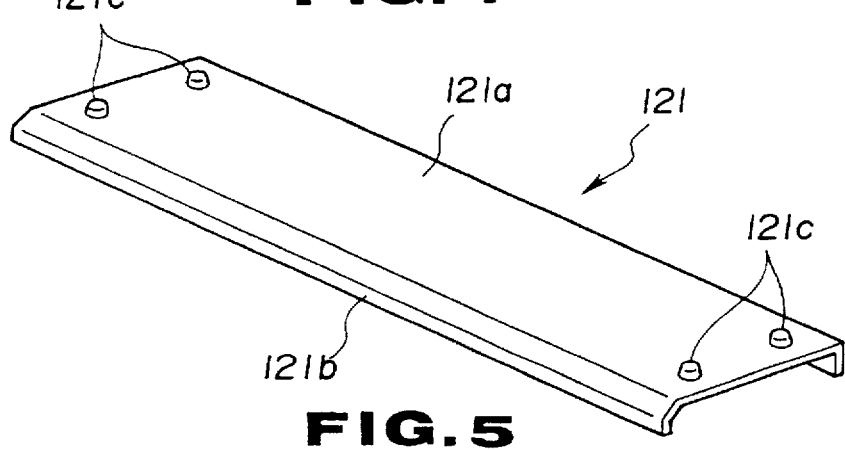
FIG. 5 is an enlarged perspective view of a restricting member which is applied in the first embodiment.

As is clear from the drawings, a restricting member 121 is accommodated within the recess 101a with a pair of coil springs 120 disposed between the restricting member and the bottom face of the recess. As shown in FIGS. 3 to 5, the restricting member 121, which is made in the form of a rectangular plate having substantially the same size as the cover glass plate 111 of the image sensor 110, has an action portion 121a coated on its surface facing the document carrier zone 103 with white color, guide portions 121b bent backwardly from both longer-side end edges of the action portion 121a, and four projection portions 121c extruded from the front surface of the action portion 121a. The restricting member 121 is disposed to be moved toward and away from the document carrier zone 103. These projection portions 121c, which are extruded as extended from the four corners of the action portion 121a in a direction perpendicular to the plane of the action portion, have respectively a height corresponding to the field depth of the image sensor 110, for example, 0.6 mm in the first embodiment. The restricting member 121 is made of a metal and thus the action portion 121a, guide portions 121b and four projection portions 121c may be integrally formed when a thin metallic plate is subjected to a suitable machining operation such as pressing.

With such a facsimile machine 100 as mentioned above, as shown in FIG. 2, driving rollers 130 and 131 are provided upstream (at the right side of FIG. 2) and downstream (at the left side of FIG. 2) of the restricting member 121 of the main casing 101 respectively; while pinch rollers 132 and 133 are provided upstream and downstream of the image sensor 110 in the sub casing 102 respectively. As shown in FIG. 4, the drive rollers 130 and 131 are arranged to be much smaller in width than the restricting member 121 and to be disposed rotatably in the main casing 101 while facing at their peripheral surfaces the document carrier zone 103 in the centers of the width direction of the document carrier zone 103 at the respective rollers 130 and 131. Meanwhile, the pinch rollers 132 and 133, which have the same width as the drive rollers 130 and 131, are provided rotatably in the sub casing 102 while facing at their peripheral surfaces the document carrier zone 103 at such positions as to oppose the corresponding drive rollers 130 and 131. Though not shown, the drive rollers 130 and 131 are connected to such a drive source as a motor through respective gear trains. The pinch rollers 132 and 133 are provided to be moved toward and away from the document carrier zone 103 and to always be energized by such energization member as a spring coil toward the document carrier zone 103.

With such a facsimile machine 100 arranged as mentioned above, as shown in FIG. 1, when the sub casing 102 is mounted to the main casing 101 at a predetermined position, the Pinch rollers 132 and 133 are held as pressed at their peripheral surfaces against the peripheral surfaces of the associated drive rollers 130 and 131 in the document carrier zone 103, the energizing force of the pair of coil springs 120 causes the four projection portions 121c of the restricting member 121 to be in pressing contact with the cover glass plate 111 of the image sensor 110, and the action portion 121a of the restricting member 121 is held parallel to the cover glass plate 111 in such a manner that a proper spacing is secured between the outer surface 111a of the cover glass plate 111 and the restricting member 121 in the document carrier zone 103. Under such a condition, though not illustrated, the projection portions 121c of the restricting member 121 are pressingly contacted with the outer surface 111a of the cover glass plate 111 at positions located outwardly of the rod lens array 114 and the photoelectric conversion element array 115.

When a start switch (not shown) is turned ON to read an original document 140 under the above condition, this causes the drive rollers 130 and 131 to be rotated so that the drive rollers 130, 131 and the pinch rollers 132, 133 cooperate to start feeding the document 140, and at the same time, the image sensor 110 is driven to start its reading operation.

The image sensor 110, until the document 140 arrives at the reading position β, reads the white color coated on the action portion 121a of the restricting member 121 to use it as a white reference at the time of actually reading the document 140.

The document 140 fed by the upstream drive roller 130 and pinch roller 132 is passed through the spacing secured between the cover glass plate 111 and the restricting member 121 and then sent toward the downstream direction by the downstream drive roller 131 and pinch roller 133, during which the image sensor 110 sequentially reads the document 140 at the reading position β to obtain image data indicative of the respective character/picture images thereon.

At this stage of the facsimile machine 100, since the document 140 is guided by the surface of the restriction member 121 within the depth of field of the image sensor 110 from the outer surface 111a of the cover glass plate 111 of the image sensor 110, the image sensor 110 can accurately read the document 140.

Meanwhile, in the case where the thickness of an original document is larger than the spacing secured between the cover glass plate 111 and the action surface of the restricting member 121, the restricting member 121 is moved away from the cover glass plate 111 by a suitable distance so that the document can be passed through the spacing in the downstream direction and thus the image sensor 110 can read the document. In this case, with the facsimile machine 100, since the document is caused to closely contact with the outer surface 111a of the cover glass 111 at the reading position β by the restricting member 121 energized by the coil springs 120, i.e., the document is guided within the depth of field of the image sensor 110, the image sensor 110 can read the document accurately.

With the facsimile machine 100 exemplified as the first embodiment, since the projection portions 121c provided on the restricting member 121 enables the spacing to be always secured between the surface of the restricting member 121 and the outer surface 111a of the cover glass plate 111, the image sensor 110 can read out character/picture images even from a limp document.

Figure 6:
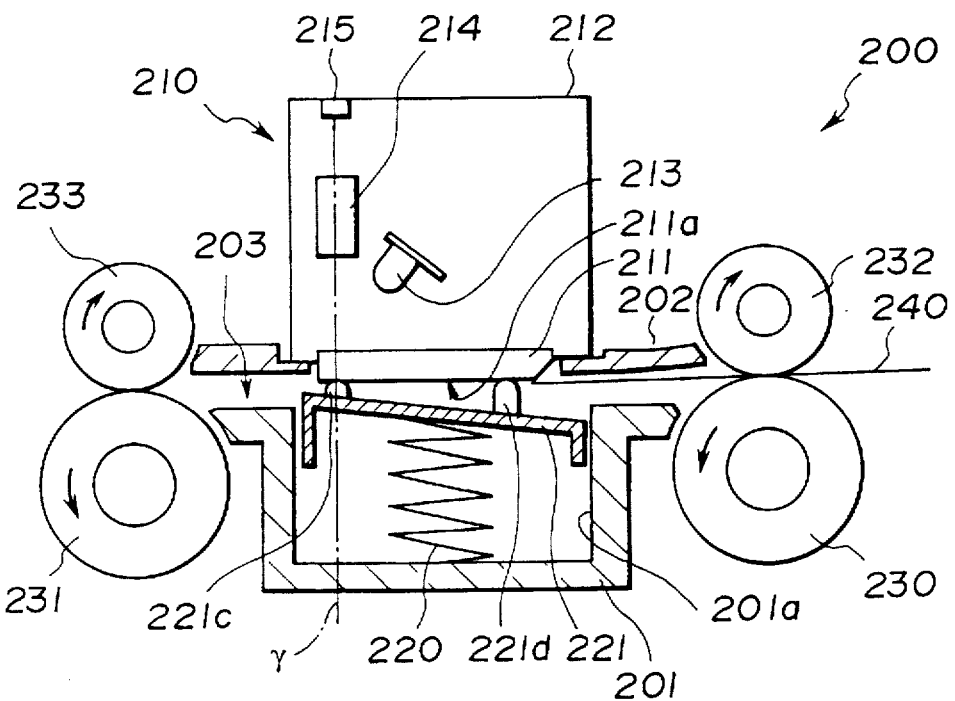
FIG. 6 is a cross-sectional view of a major part of a data reader in accordance with a second embodiment of the present invention.

Shown in FIG. 6 is a data reader in accordance with a second embodiment of the present invention. The illustrated data reader, which is applied to a facsimile machine 200, includes, as in the facsimile machine 100 exemplified in the foregoing first embodiment, a main casing 201 and a sub casing 202 which can be opened or removed from the main casing 201. A document carrier zone 203 is also formed between the main casing 201 and the sub casing 202. The facsimile machine 200 of the present embodiment is different from the facsimile machine 100 of the foregoing first embodiment in the reading position of the contact type image sensor and the structure of the restricting member. More specifically, as illustrated, an image sensor 210, as in the image sensor 110 of the first embodiment, is arranged so that a light source 213, a rod lens array 214 and a photoelectric conversion element array 215 are disposed within the interior or a frame 212 covered at its one side by a cover glass plate 211. The cover glass plate 211 is held to the sub casing 202 so as to face the aforementioned document carrier zone 203. With this image sensor 210, an outer surface 211a of the cover glass plate 211 is formed as a data reading plane and a reading position γ is set at the downstream side (leftward in FIG. 6) of the center of the cover glass plate 211. Further, the image sensor 210 used in the second embodiment is set to have a field depth of 0.6 mm spaced from the outer surface 211a of the cover glass plate 211.

Figure 7:
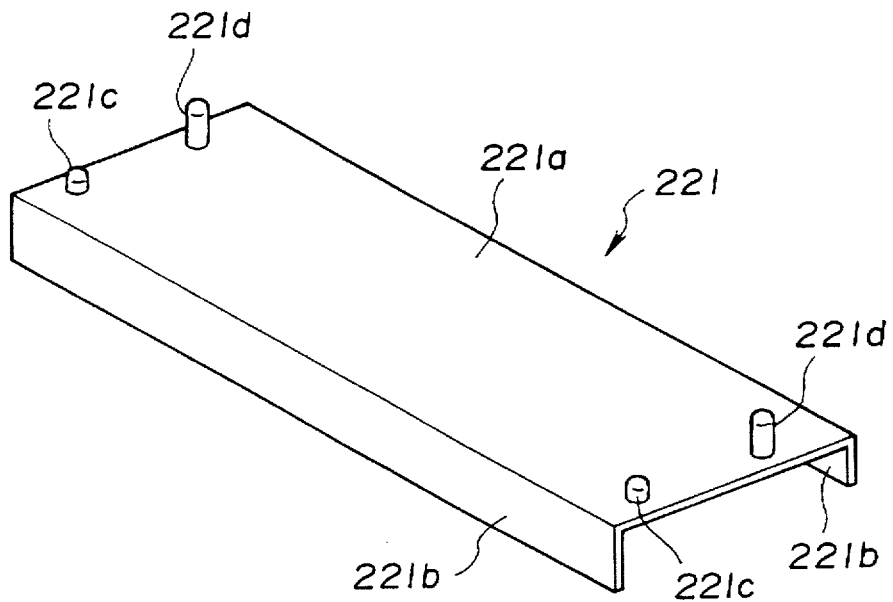
FIG. 7 is an enlarged perspective view of a restricting member which is applied in the second embodiment.

On the other hand, a restricting member 221 employed in the second embodiment, is made in the form of a rectangular plate substantially corresponding in size to the cover glass plate 211 of the image sensor 210, as shown in FIGS. 6 and 7. That is, the restricting member 221 has an action portion 221a coated with white color and facing the document carrier zone 203, guide portions 221b bent backwardly from both longer-side end edges of the action portion 221a to be parallel to each other and inclined to the action portion 221a, and a pair of small projection portions 221c and a pair of large projection portions 221d respectively extruded from the surface of the action portion 221a. In more detail, the small projection portions 221c are extruded from two of four corners of the action portion 221a opposed to the reading position γ of the image sensor 210 to be parallel to the guide portions 221b, and have respectively a height corresponding to a depth of field of the image sensor 210, for example, 0.66 mm in the second embodiment. Meanwhile, the large projection portions 221d are formed to be much higher than the small projection portions 221c and extruded from the remaining downstream two of the four corners of the action portion 221a to be parallel to the guide portions 221b. The large projection portions 221d in the second embodiment are also formed to have such a height that a common plane including the surface of the tip ends of the large projection portions 221d and the surface of the tip ends of the small projection portions 221c is perpendicular to the planes of extensions of the guide portions 221b.

Like the restricting member 121 in the first embodiment, the restricting member 221 is accommodated within a recess 201a formed in the main casing 201 with a pair of coil springs 220 disposed between the restricting member 221 and the bottom surface of the recess 201a, so that the restricting member 221 can be moved toward and away from the document carrier zone 203. The restricting member 221 is also made of a metallic material. When a thin metallic plate is subjected to such a machining operation as pressing, the action portion 221a, guide portions 221b and four projection portions 221c and 221d may be integrally formed.

With such a facsimile machine 200 arranged as mentioned above, as shown in FIG. 6, when the sub casing 202 is mounted to the main casing 201 at a predetermined position, the pinch rollers 232 and 233 are held as pressed at their peripheral surfaces against the peripheral surfaces of the associated drive rollers 230 and 231 in the document carrier zone 203, the energizing force of the pair of coil springs 220 causes the small and large projection portions 221c and 221d of the restricting member 221 to be in pressing contact with the cover glass plate 211 of the image sensor 210, and the action portion 221a of the restricting member 221 is held to be tilted to the cover glass plate 211 in such a manner that a proper spacing is secured between the outer surface 211a of the cover glass plate 211 and the front surface of the restricting member 221 in the document carrier zone 203. At this time, the spacing secured between the outer surface 211a of the cover glass plate 211 and the front surface of the restricting member 221 is gradually increased toward its upstream side (rightward in FIG. 6), due to a difference in height between the small and large projection portions 221c and 221d. Though not illustrated, the projection portions 221c and 221d of the restricting member 221 are pressingly contacted with the outer surface 211a of the cover glass plate 211 at positions located outwardly of the rod lens array 214 and the photoelectric conversion element array 215.

When a start switch (not shown) is turned ON to read an original document 240 under the above condition, this causes the drive rollers 230 and 231 to be rotated so that the drive rollers 230, 231 and the pinch rollers 232, 233 cooperate to start feeding the document 240, and at the same time, the image sensor 210 is driven to start its reading operation.

The image sensor 210, until the document 240 arrives at the reading position γ, reads the white color coated on the action portion 221a or the restricting member 221 to use it as a white reference at the time of actually reading the document 240.

The document 240 fed by the upstream drive roller 230 and pinch roller 232 is passed through the spacing secured between the cover glass plate 211 and the restricting member 221 and then sent toward the downstream direction by the downstream drive roller 231 and pinch roller 233, during which the image sensor 210 sequentially reads the document 240 at the reading position γ to obtain image data indicative of the respective character/picture images thereon.

At this stage of the facsimile machine 200, since the document 240 is guided by the surface of the restricting member 221 within the depth of field of the image sensor 210 from the outer surface 221a of the cover glass 211 of the image sensor 210, the image sensor 210 can accurately read the document 240.

Meanwhile, in the case where the thickness of an original document is larger than the spacing secured between the cover glass plate 211 and the surface of the restricting member 221, the restricting member 221 is moved away from the cover glass plate 211 by a suitable distance so that the document can be passed through the spacing in the downstream direction and thus the image sensor 210 can read the document In this case, with the facsimile machine 200, the document is caused to closely contact with the outer surface 211a of the cover glass 211 at the reading position γ by the restricting member 221 energized by the coil springs 220, i.e., the document is guided within the depth of field of the image sensor 210, and the image sensor 210 can read the document accurately.

With the facsimile machine 200 exemplified as the second embodiment, since the projection portions 221c and 221d provided on the restricting member 221 enable the spacing to be always secured between the surface of the restricting member 221 and the outer surface 211a of the cover glass plate 211, the image sensor 210 can read out character/picture images even from a limp document. Further, in the facsimile machine 200, since the spacing between the restricting member 221 and the cover glass plate 211 of the image sensor 210 is arranged to gradually increase toward the upstream side, the document can be positively introduced into the spacing.

Figure 8:
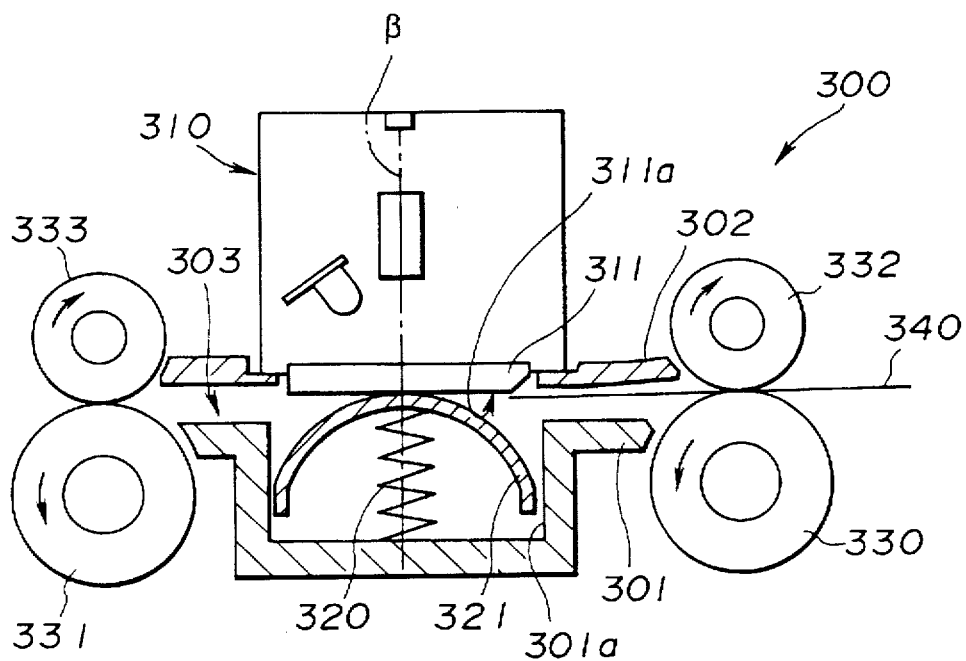
FIG. 8 is a cross-sectional view of a major part of a data reader in accordance with a third embodiment of the present invention.

Shown in FIG. 8 is a data reader in accordance with a third embodiment of the present invention. The illustrated data reader, which is applied to a facsimile machine 300, includes, as in the facsimile machine 100 exemplified in the foregoing first embodiment, a main casing 301 and a sub casing 302 which can be opened or removed from the main casing 301. A document carrier zone 303 is also formed between the main casing 301 and the sub casing 302. The facsimile machine 300 of the present embodiment is different from the facsimile machine 100 of the foregoing first embodiment only in the structure of the restricting member.

Figure 9:
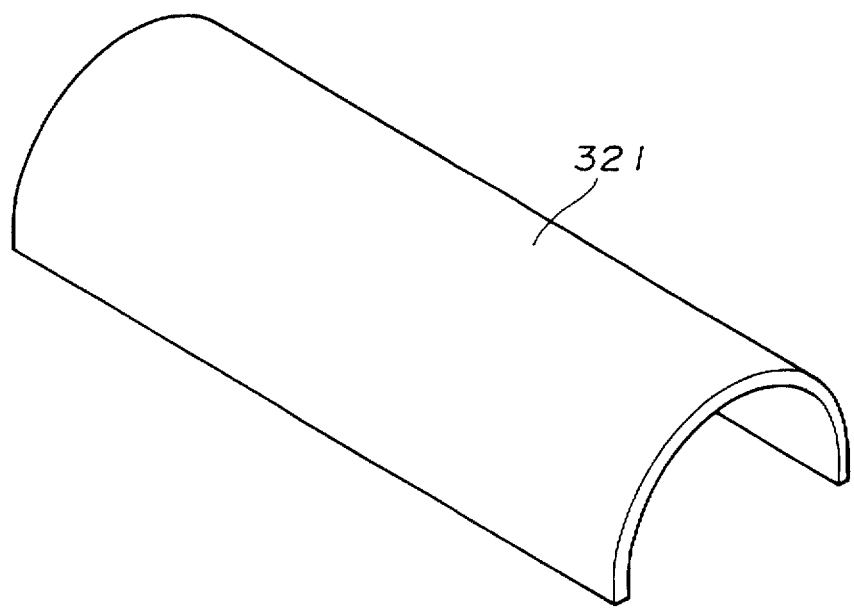
FIG. 9 is an enlarged perspective view of a restricting member which is applied in the third embodiment.

More specifically, a restricting member 321 used in the third embodiment has a width and a length substantially corresponding to a cover glass plate 311 of an image sensor 310 as shown in FIGS. 8 and 9, and also is bent from its center position corresponding to the reading position β of the image sensor 310 toward the upstream side (rightward in FIG. 8) and downstream side (leftward in FIG. 8) of the reading position and is thus gradually spaced from the document carrier zone 303. The restricting member 321 is coated with white color on its outer surface facing the document carrier zone 303. The restricting member 321 is accommodated within a recess 301a of the main casing 301 with a pair of coil springs 320 disposed between the bottom surface of the recess and the restricting member, so that the restricting member can be moved toward and away from the document carrier zone 303.

The restricting member 321 is also made of a metallic material and may be made by subjecting a thin metallic plate to such a machining operation as pressing.

With such a facsimile machine 300 arranged as mentioned above, as shown in FIG. 8, when the sub casing 302 is mounted to the main casing 301 at a predetermined position, the pinch rollers 332 and 333 are held as pressed at their peripheral surfaces against the peripheral surfaces of the associated drive rollers 330 and 331 in the document carrier zone 303, the energizing force of the pair of coil springs 320 causes the outer peripheral surface of the restricting member 321 to be kept pressingly contacted with the cover glass plate 311 of the image sensor 310 throughout its full width at the reading position β of the image sensor 310.

When a start switch (not shown) is turned ON to read an original document 340 under the above condition, this causes the drive rollers 330 and 331 to be rotated so that the drive rollers 330, 331 and the pinch rollers 332, 333 cooperate to start feeding the document 340, and at the same time, the image sensor 310 is driven to start its reading operation.

The image sensor 310, until the document 340 arrives at the reading position β, reads the white color coated on the restricting member 321 to use it as a white reference at the time of actually reading the document 340.

When the document 340 fed by the upstream drive roller 330 and pinch roller 332 arrives at a position immediately before the reading position β of the image sensor 310, the feeding force of the document 340 causes the restricting member 321 to be moved by a suitable distance away from the cover glass plate 311 against the energization force or the coil springs 320, whereby a spacing is defined between the restricting member 321 and the cover glass plate 311, so that the document 340 can pass through the spacing and thus the image sensor 310 can read the document 340.

At this stage of the facsimile machine 300, the restricting member 321 energized by the coil springs 320 causes the document 340 to be brought into close contact with the outer surface 311a of the cover glass plate 311 at the reading position β, i.e., the document is guided within the depth of field of the image sensor 310, the image sensor 310 can read the document 340 accurately in addition, since the restricting member 321 is shifted from the cover glass plate 311 by a distance corresponding to the thickness of the document 340, even when a thick document is used, the image sensor 310 can read the document accurately. Further, since such a spacing that gradually increases from the reading position of the image sensor 310 toward its upstream side is secured between the cover glass plate 311 and the restricting member 321, the document can be reliably guided toward the reading position β.

Figure 10:
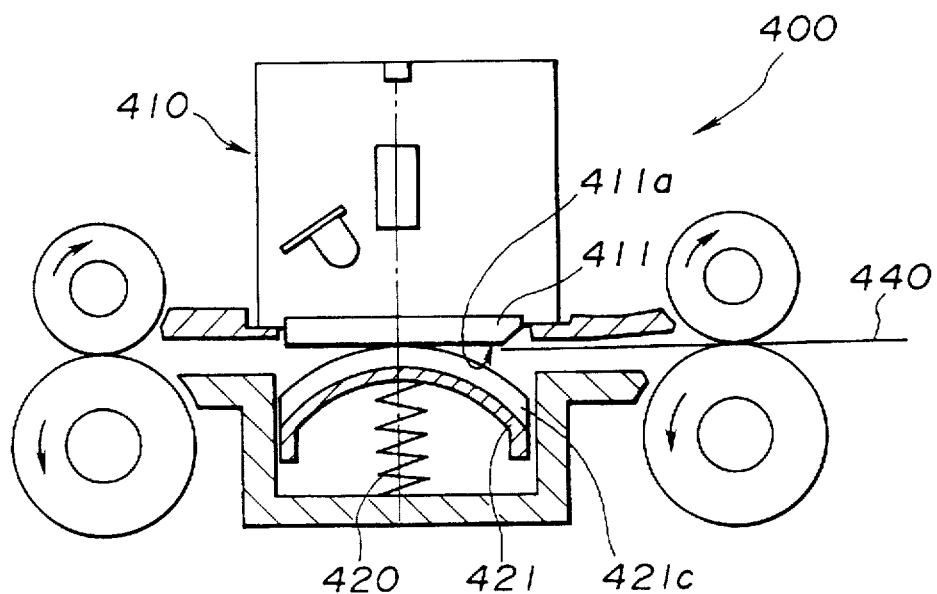
FIG. 10 is a cross-sectional view of a major part of a data reader in accordance with a fourth embodiment of the present invention.
Figure 11:
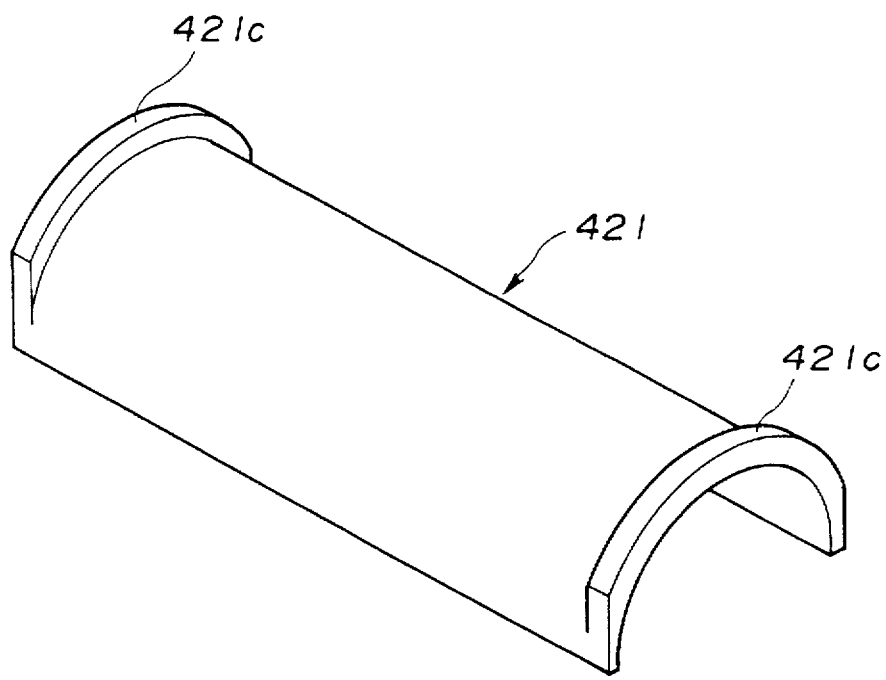
FIG. 11 is an enlarged perspective view of a restricting member which is applied in the fourth embodiment.

Although the restricting member 321 has been arranged to be directly contacted with the outer surface 311a of the cover glass plate 311 in the facsimile machine 300 of the third embodiment, such an arrangement of a fourth embodiment as shown in FIG. 11 may be employed. That is, in the fourth embodiment, shown in FIG. 11, a restricting member 421 is provided at its both ends with extrusions 421c which continously extend through the full width of he restricting member along the feed direction of an original 440 and also which have a height corresponding to The field depth of a image sensor 410. In more detail, as shown in FIG. 10, it may be arranged that the restricting member 421 is disposed to be contacted at the extrusions 421c with an outer surface 411a of a cover glass plate 411 by a pair of coil springs 420.

With the facsimile machine 400 exemplified as the fourth embodiment, since a spacing is always secured between the outer surface 411a of the cover glass plate 411 and the outer peripheral surface of the restricting member 421, the image sensor 410 can read out character/picture images even from a limp document.

Figure 12:
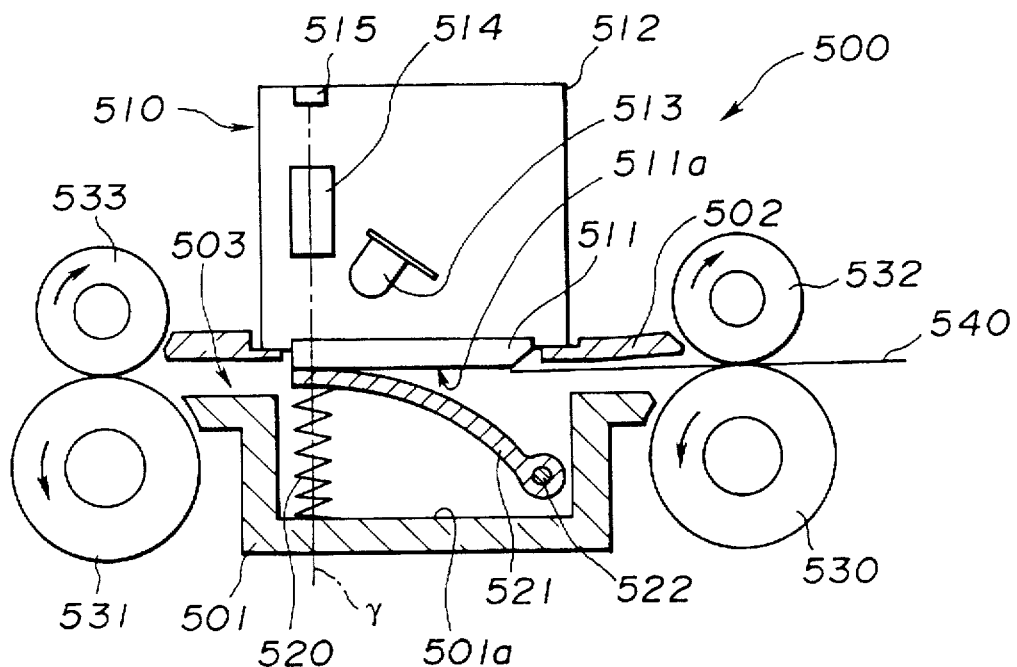
FIG. 12 is a cross-sectional view of a major part of a data reader in accordance with a fifth embodiment of the present invention.

Shown in FIG. 12 is a data reader in accordance with a fifth embodiment of the present invention. The illustrated data reader, which is applied to a facsimile machine 500, includes, as in the facsimile machine 100 exemplified in the foregoing first embodiment, a main casing 501 and a sub casing 502 which can be opened or removed from the main casing 501. A document carrier zone 503 is also formed between the main casing 501 and the sub casing 502. The facsimile machine 500 of the present embodiment is different from the facsimile machine 100 of the foregoing first embodiment in the reading position of the contact type image sensor and the structure of the restricting member. More specifically, as illustrated, an image sensor 510, as in the image sensor 110 of the first embodiment, is arranged so that a light source 513, a rod lens array 514 and a photoelectric conversion element array 515 are disposed within the interior of a frame 512 covered at its one side by a cover glass plate 511. The cover glass plate 511 is held to the sub casing 502 so as to face the aforementioned document carrier zone 503. With this image sensor 510, an outer surface 511a of the cover glass plate 511 is formed as a data reading plane and a reading position γ is set at the downstream side (leftward in FIG. 12) of the center of the cover glass plate 511.

Figure 13:
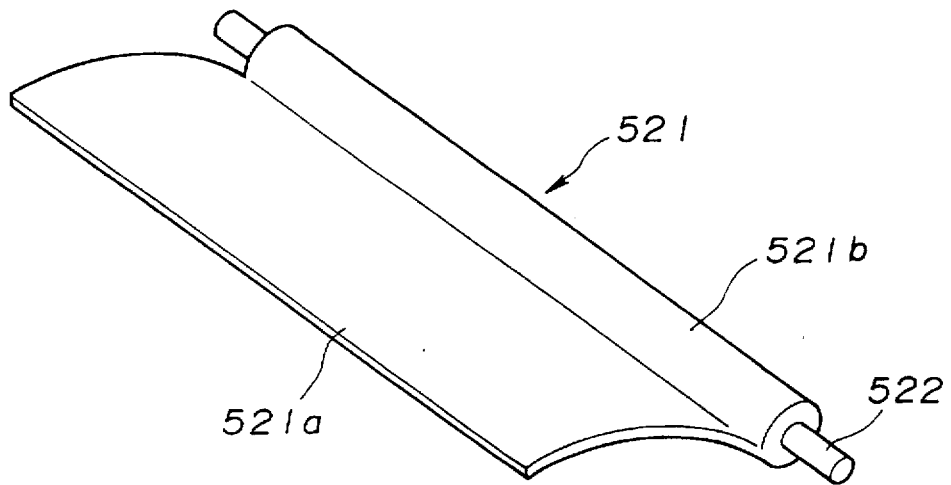
FIG. 13 is an enlarged perspective view of a restricting member which is applied in the fifth embodiment

On the other hand, as shown in FIGS. 12 and 13, a restricting member 521 used in the fifth embodiment has a width and a length substantially corresponding to a cover glass plate 511 of an image sensor 510, and also is bent from the reading position γ of the image sensor 510 toward the upstream side (rightward in FIG. 12) of the reading position and gradually spaced from the document carrier zone 503. The restricting member 521 has an action portion 521a coated with white color on its outer surface facing the document carrier zone 503, a cylindrical support portion 521b provided at an upstream end edge of the action portion 521a, and a shaft member 522 rotatably inserted through the support portion 521b. The restricting member 521 is accommodated within a recess 501a of the main casing 501 with a pair of coil springs 520 disposed between the bottom surface of the recess and the restricting member in such a manner that the both ends of the shaft member 522 are securely fixed to the main casing 501, so that the restricting member can be moved toward and away from the document carrier zone 503.

With such a facsimile machine 500 arranged as mentioned above, as shown in FIG. 12, when the sub casing 502 is mounted to the main casing 501 at a predetermined position, pinch rollers 532 and 533 are held as pressed at their peripheral surfaces against the peripheral surfaces of associated drive rollers 530 and 531, and the energizing force of the pair of coil springs 520 causes the outer peripheral surface of the restricting member 521 to be kept pressingly contacted with the cover glass plate 511 of the image sensor 510 throughout its full width at the reading position γ the image sensor 510 in the document carrier zone 503.

When a start switch (not shown) is turned ON to read an original document 540 under the above condition, this causes the drive rollers 530 and 531 to be rotated so that the drive rollers 530, 531 and the pinch rollers 532, 533 cooperate to start feeding the document 540, and at the same time, the image sensor 510 is driven to start its reading operation.

The image sensor 510, until the document 540 arrives at the reading position γ reads the white color coated on the action portion 521a of the restricting member 521 to use it as a white reference at the time of actually reading the document When the document 540 fed by the upstream drive roller 530 and pinch roller 532 arrives at a position immediately upstream of the reading position γ of the image sensor 510, the feeding force of the document 540 causes the restricting member 521 to be moved by a suitable distance away from the cover glass plate 511 against the energization, force of the coil springs 520, whereby a spacing is defined between the restricting member 521 and the cover glass plate 511, so that the document 540 can pass through the spacing and thus the image sensor 510 can read the document 540.

At this stage of the facsimile machine 500, the restricting member 521 energized by the coil springs 520 causes the document 540 to be brought into contact with the outer surface 511a of the cover glass plate 511 at the reading position γ, i.e., the document is guided within the depth of field of the image sensor 510, and the image sensor 510 can read the document 540 accurately. In addition, since the restricting member 521 is shifted from the cover glass plate 511 by a distance corresponding to the thickness of the document 540, even when a thick document is used, the image sensor 510 can read the document accurately. Further, since such a spacing is secured between the cover glass plate 511 and the restricting member 521 on the upstream side of the reading position γ of the image sensor 510, the document can be reliably guided toward the reading position γ.

Figure 14:
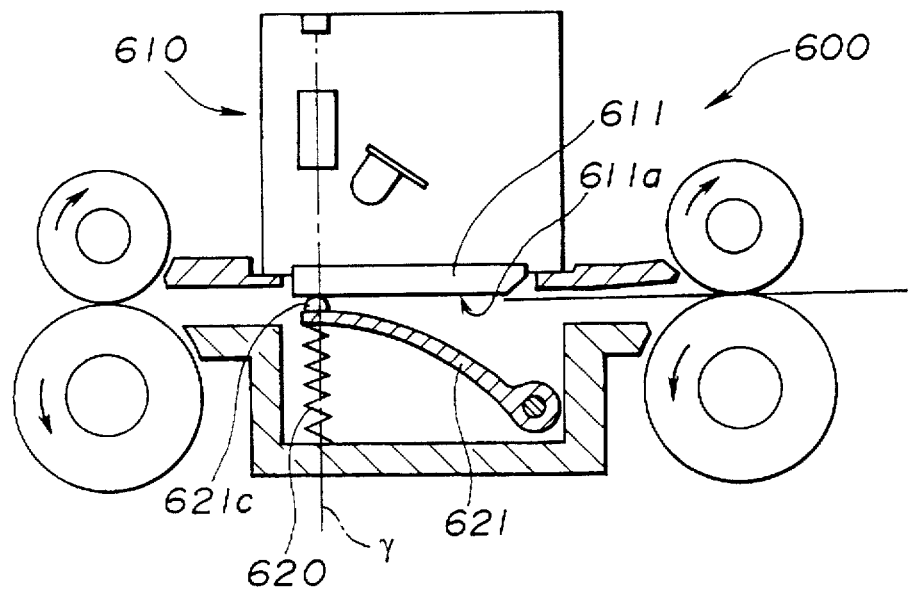
FIG. 14 is a cross-sectional view of a major part of a data reader in accordance with a sixth embodiment of the present invention.
Figure 15:
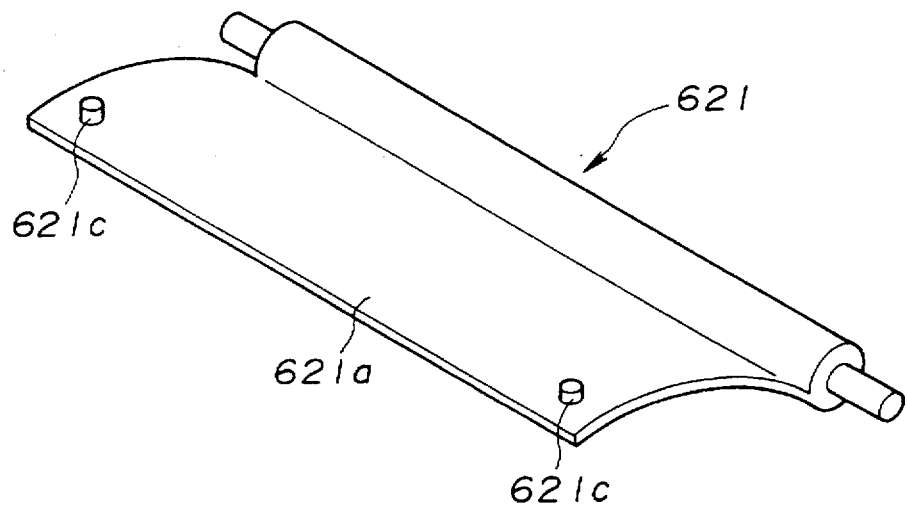
FIG. 15 is an enlarged perspective view of a restricting member which is applied in the sixth embodiment.

Although the restricting member 521 has been arranged to be pressingly contacted directly with the outer surface 511a of the cover glass plate 511 in the facsimile machine 500 of the fifth embodiment, such an arrangement of a sixth embodiment as shown in FIG. 14 may be employed. That is, in the sixth embodiment, as shown in FIG. 15, a restricting member 621 is provided with an action portion 621a and with a pair of projection portions 621c which are extruded from the action portion 621a at both corners thereof corresponding to the reading position γ of an image sensor 610. The projection portions 621c have a height corresponding to the field depth of the image sensor 610, for example, 0.6 mm. In more detail, as shown in FIG. 14, the restricting member 621 is disposed to be contacted at the projection portions 621c with an outer surface 611a of a cover glass plate 611 by a pair or coil springs 620.

With a facsimile machine 600 exemplified as the sixth embodiment, since a spacing is always secured between the outer surface 611a of the cover glass plate 611 and the outer peripheral surface of the restricting member 621, the image sensor 610 can read out character/picture images even from a limp document.

In accordance with the foregoing first, second, fourth and sixth embodiments, in the data reader arranged to cause the projection portions of the restricting member to provide the predetermined spacing between the reading plane of the reading unit and the restricting member, these projection portions of the restricting member are integrally formed with the restricting member. However, the data reading unit may be provided with such projection portions, or separate projection members may be adhered to either one of the data reading unit and the restricting member.

Figure 16:
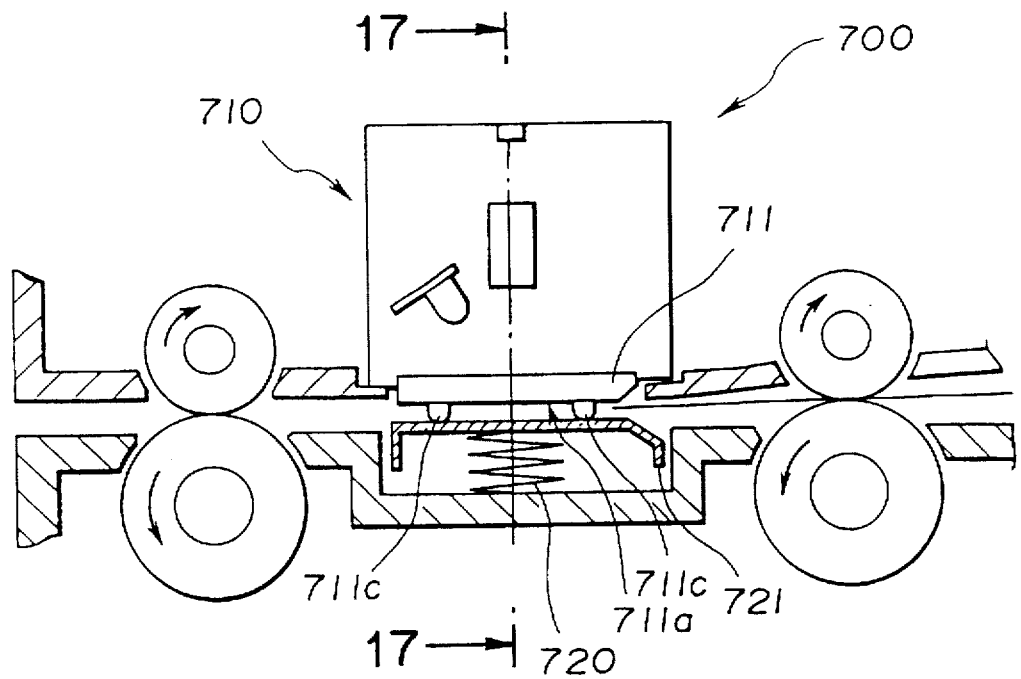
FIG. 16 is a cross-sectional view of a major part of a data reader in accordance with a seventh embodiment of the present invention.
Figure 17:
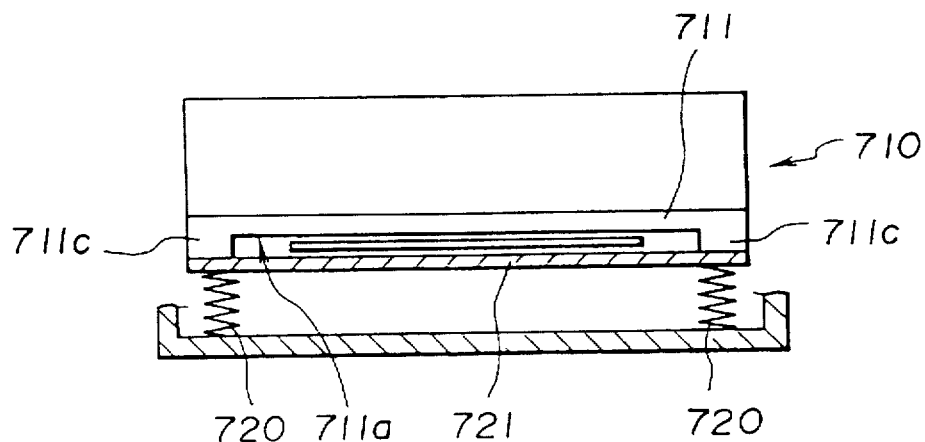
FIG. 17 is a cross-sectional view taken along line 17—17 in FIG. 16.
Figure 18:
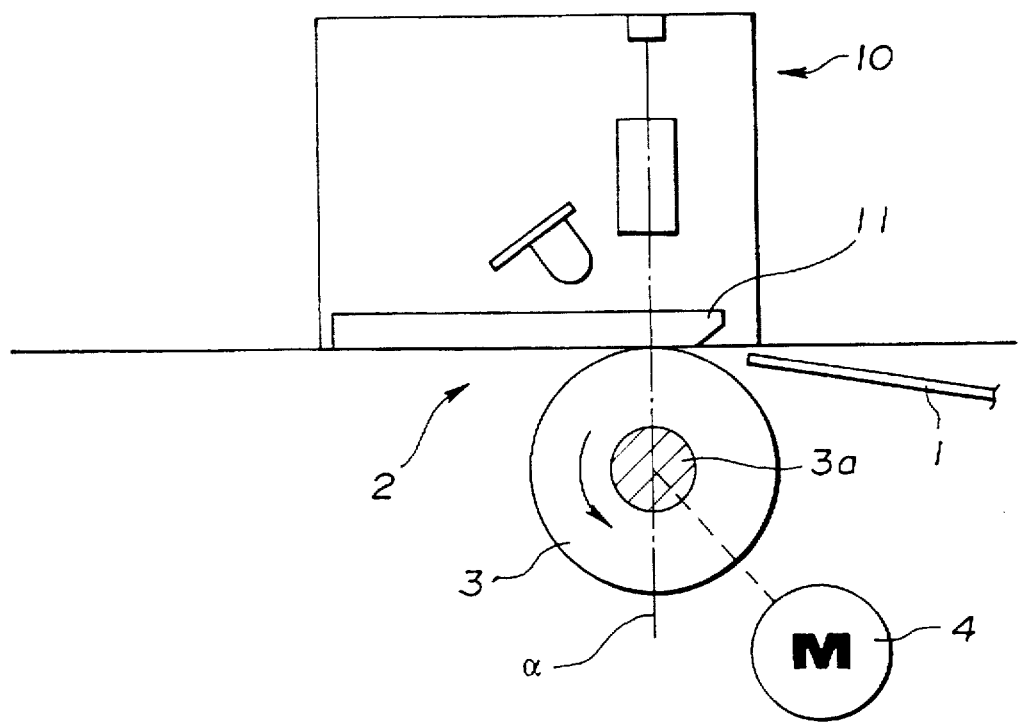
FIG. 18 is a cross-sectional view of a major part of a prior art data reader.

For example, in a seventh embodiment shown in FIGS. 16 and 17, a cover glass plate 711 has projection portions 711c formed thereon by processing the cover glass plate 711 of an image sensor 710. In this case, the restricting member 721 is pressingly contacted with the projection portions 711c by a pair of coil springs 720 to secure a spacing corresponding to the field depth of the image sensor 710 between an outer surface 711a of the cover glass plate 711 and the restricting member 721.

In the first and seventh embodiments, since the projection portions are formed to be the same in height, the restricting member and the cover glass of the image sensor can be held parallel. Therefore, even if the reading position of the image sensor is shifted toward the upstream side or toward the downstream side, the document can be accurately read out without hindrance.

What is claimed is:

1. A data reader having data reading means fixedly disposed on a housing of the data reader and document feeding means for feeding an original document toward a reading plane of the data reading means, the data reading means reading character/picture images from the original document when the original document is fed along the reading plane of the data reading means, the data reader comprising:

a restricting member having a planer area facing at least a reading position of the data reading means, the restricting member facing the reading plane of the data reading means and being movable toward and away from the reading plane, the restricting member allowing the original document fed by the document feeding means to be introduced into a spacing between the reading plane and the restricting member; and a pair of biasing members for constantly biasing the restricting member toward the reading plane.

2. A data reader as set forth in claim 1, wherein the planar area of the restricting member is parallel to the reading plane.

3. A data reader as set forth in claim 1, wherein the restricting member is disposed so that a distance between the planar area and the reading plane gradually increases from the reading position toward an upstream side.

4. A data reader as set forth in claim 1, wherein the data reading means is a contact type image sensor having a transparent plate, and the reading plane is formed as an outer surface of the transparent plate.

5. A data reader as set forth in claim 1, wherein at least the area of the restricting member facing the reading position is white in color.

6. A data reader having data reading means fixedly disposed on a housing of the data reader and document feeding means for feeding an original document toward a reading plane of the data reading means, the data reader being arranged for reading character/picture images from the original document by the data reading means by feeding the original document along the reading plane of the data reading means, the data reader comprising:

a restricting member facing at least a reading position of the data reading means, the restricting member being pivotally supported at a pivot point at an upstream end such that the restricting member is movable toward and away from the reading plane, the restricting member allowing the original document fed by the document feeding means to be introduced into a spacing between the reading plane and the restricting member; and a pair of biasing members for constantly biasing the restricting member toward the reading plane.

7. A data reader as set forth in claim 6, wherein the restricting member is disposed so that a distance between the restricting member and the reading plane gradually increases from the reading position toward an upstream side.

8. A data reader as set forth in claim 6, wherein the data reading means is a contact type image sensor having a transparent plate, and the reading plane is formed as an outer surface of the transparent plate.

9. A data reader as set forth in claim 6, wherein at least an area of the restricting member facing the reading position is white in color.

10. A data reader having data reading means fixedly disposed on a housing of the data reader and document feeding means for feeding an original document toward a reading plane of the data reading means, the data reading means reading character/picture images from the original document when the original document is fed along the reading plane of the data reading means, the data reader comprising:

a recess area formed at a position facing the data reading means;

a restricting member being accommodated in the recess area so that the restricting member faces the reading plane of the data reading means and is movable toward and away from the reading plane, the restricting member allowing the original document fed by the document feeding means to be introduced into a spacing between the reading plane and the restricting member; and a pair of biasing members for constantly biasing the restricting member toward the reading plane.

11. A data reader as set forth in claim 10, wherein the data reading means is a contact type image sensor having a transparent plate and the reading plane is formed as an outer surface of the transparent plate.

12. A data reader as set forth in claim 10, wherein at least an area of the restricting member facing the reading plane is white in color.

13. A data reader having data reading means fixedly disposed on a housing of the data reader and document feeding means for feeding an original document toward a reading plane of the data reading means, the data reading means reading character/picture images from the original document when the original document is fed along the reading plane of the data reading means, the data reader comprising:

a restricting member facing at least a reading position of the data reading means and being movable toward and away from the reading plane;

a pair of biasing members for constantly biasing the restricting member toward the reading plane; and projection members, formed at four corners of at least one of the data reading means and the restricting member and abutting against an opposing portion of the data reading means or the restricting member not having projection members, to provide a space for introducing the original document fed by the document feeding means between the reading plane and the restricting member.

14. A data reader as set forth in claim 13, wherein the restricting member has a planar area facing at least the reading position of the data reading means, and the projection members are formed in the planar area.

15. A data reader as set forth in claim 14, wherein the projection members are disposed at a downstream side and an upstream side of the planar area, the projection members at the downstream side being shorter than a length of the projection members disposed at the upstream side.

16. A data reader as set forth in claim 13, wherein the data reading means is a contact type image sensor having a transparent plate and the reading plane is formed as an outer surface of the transparent plate.

17. A data reader as set forth in claim 13, wherein at least an area of the restricting member facing the reading position is white in color.

* * * * *